United States Patent [19]

Brandenstein et al.

[11] Patent Number: 5,066,147
[45] Date of Patent: Nov. 19, 1991

[54] MEANS FOR MOUNTING A BEARING RING

[75] Inventors: Manfred Brandenstein, Eubenheim; Armin Olschewski, Schweinfurt; Klaus Kispert, Schweinfurt; Burkhard von Bredow, Kutzberg, all of Fed. Rep. of Germany

[73] Assignee: SKF GmbH, Schweinfurt, Fed. Rep. of Germany

[21] Appl. No.: 687,849

[22] Filed: Apr. 19, 1991

Related U.S. Application Data

[63] Continuation of Ser. No. 476,840, Feb. 8, 1980, abandoned.

[30] Foreign Application Priority Data

Sep. 21, 1989 [DE] Fed. Rep. of Germany ....... 3931447

[51] Int. Cl.⁵ ............................................. F16C 33/58
[52] U.S. Cl. ..................................... 384/585; 384/537; 384/903

[58] Field of Search ............ 384/537, 585, 903, 905.1; 29/525, 520

[56] References Cited

U.S. PATENT DOCUMENTS

| | | | |
|---|---|---|---|
| 4,125,298 | 11/1978 | Heurich | 384/537 |
| 4,611,933 | 9/1986 | Hofmann et al. | 384/537 |
| 4,886,392 | 12/1989 | Iio | 29/525 |

*Primary Examiner*—Lenard A. Footland
*Attorney, Agent, or Firm*—Eugene E. Renz, Jr.

[57] ABSTRACT

Means for securing a hardened roller bearing ring by means of a press fit on the softer bearing seating surface of a machine part in a predetermined axial position, comprising means defining at least one peripheral groove (6, 7, 8, 9), which has a sharp-edged transition to the surface of the roller bearing ring (2, 4) in the surface of the rolling bearing ring (2, 4) co-existing with the seating surface of the machine part.

1 Claim, 1 Drawing Sheet

MEANS FOR MOUNTING A BEARING RING

This is a continuation of copending application Ser. No. 07/476,840, filed on Feb. 8, 1990, now abandoned.

FIELD OF THE INVENTION

The present invention relates to improvements in means for securing a bearing ring of a bearing assembly in an axial position on a bearing seating surface.

BACKGROUND OF THE INVENTION

In some roller bearing applications, the axial space for the bearing is constricted or limited. For example, in some bearings mounted on axles or shafts or in housings, there is often insufficient room available apart from the bearing to house a locking element to prevent axial creep of the bearing. Typically in these cases, a press fit connection is used. However this has the drawback that under certain radial loads acting on the bearing, the press fit frequently becomes so loose that undesirable creep in the axial direction still occurs.

West German Offenlegungsschrift No. 2,611,218 offers a solution to this problem. In accordance with the arrangement disclosed, the roller bearing rings are adapted to be attached in the bore of the housing by the use of a stamping tool of a special stamping machine which operates to press material from the housing or shaft into a peripheral groove in the roller bearing ring. This is accomplished by pressing the stamping tool into the end surface of the housing or shaft so that the displaced material is forced into the groove.

A disadvantage or drawback of this method of attachment is that it requires the use of a complicated auxiliary device. Furthermore, it has been found that during the mounting process, the end surfaces of the housing and/or the shaft are often deformed in an undesirable manner. There are additional objections to this method. For example, the housing and the shaft are frequently not sufficiently accessible, prohibiting setup of the stamping machine in a suitable position. Another drawback is that often the bearing seating surface is located at too great a distance from the end surfaces.

SUMMARY OF THE INVENTION

With the foregoing in mind, it is an object of the present invention to provide a new and improved means for mounting a bearing ring, characterized by novel features of the construction and arrangement obviating the need for additional locking elements or a follow up deformation step, characteristic of the prior methods discussed above. To this end, the bearing ring is preferably made of a material harder than the bearing seating surface and is provided with at least one peripheral groove which has a sharp edge at the transition to the surface of the roller bearing ring. By this arrangement, a clamping effect occurs depending on the oversize of the press fit, the material characteristics, and the material hardness. This clamping effect can occur by reason of the material of the shaft or housing flowing or expanding into the grooves merely under the pressure of the bearing ring onto the shaft or housing, without any scraping or welding effect. Material can be scraped off and collected in the grooves in addition to the material flow and lastly the scraping effects an additional welding phenomenon. These effects, scraping and welding, can occur simultaneously. It has been found that, depending on the extent of the oversize of the press fit between the bearing ring and the machine part, and the difference in hardness between the roller bearing ring and seating surface, the axial load bearing capacity exceeds that of a conventional press fit. Furthermore, it has been found that neither locking elements nor any additional pressing, riveting, peening or similar type of operation is required to secure the ring in its axial position.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
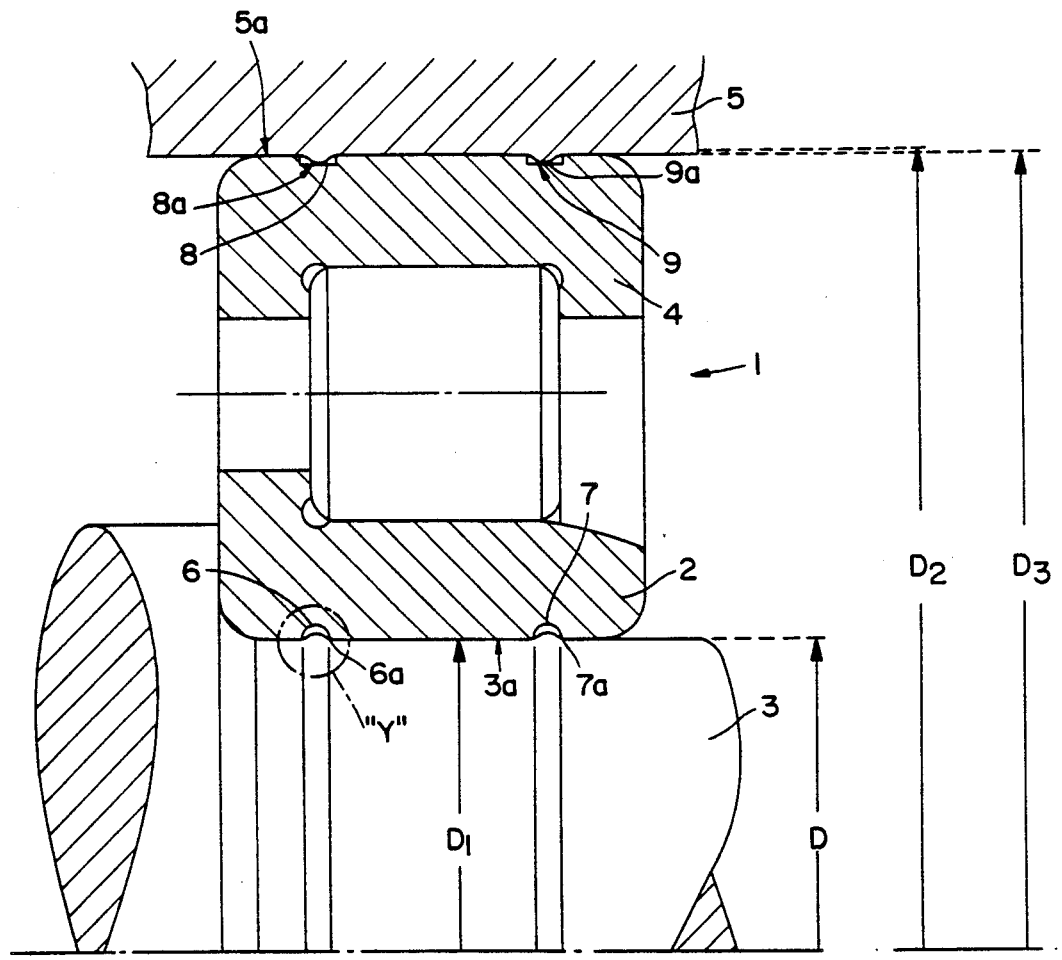
FIG. 1 is a transverse sectional view through a bearing design in accordance with the present invention.

Referring now to the drawings, and particularly to FIG. 1 thereof, there is shown a cylindrical roller bearing 1 having an inner ring 2 mounted on a shaft 3 and an outer ring located in the bore 5a of a housing 5. The bore 2a of inner ring 2 has a pair of axially spaced, circumferentially extending peripheral grooves 6 and 7 of a circular cross section defining sharp edges 6a and 7a at the transition to the bore surface 2a of the inner ring 2.

Outer ring 4 is also provided with two axially spaced, peripherally extending grooves 8 and 9. As illustrated, these grooves are flat and are rounded only at the corners of the base of the groove. However, the transition to the lateral peripheral surface of the outer ring is a sharp edge as at 8a and 9a.

Outer ring 4 and inner ring 2 are hardened at least in the area of the outer peripheral surfaces to a degree that these surfaces are harder then the peripheral surface 3a of the shaft and the bore surface 5a of the housing. Further, the diameter D of shaft 3 is slightly larger than the bore diameter D1 of inner ring 2 to provide a press fit when the two are assembled. This relationship is also true for the outer ring 4 which has a diameter D2 slightly larger than the bore diameter D3 of the housing 5. By this configuration, the inner ring is pressed onto the bearing seating surface 3a of shaft 3 and the outer ring 4 is pressed into the bearing seating surface 5a of housing 5. Further, this arrangement produces an area of contact between the bearing seating surfaces in question and the peripheral surfaces of the roller bearing rings 2 and 4 which, upon assembly, produces flow of material from the machine parts 3 and 5, into the grooves 6, 7, 8 and 9 of roller bearing rings 2 and 4.

Figure 2:
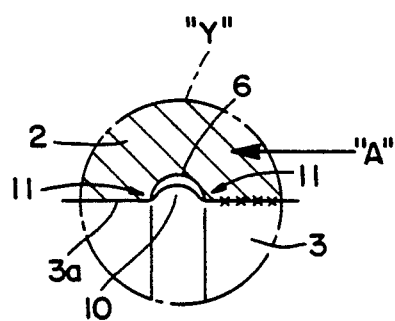
FIG. 2 is an enlarged fragmentary view of the area designated "Y" in FIG. 1.

As best illustrated in FIG. 2 which is the enlarged area designated "Y" of FIG. 1, the material of shaft 3 flows into grooves 6, and creates an enlarged annulus providing a positive form locking connection between the shaft and the inner ring to lock the ring in a fixed axial position. To the extent that the oversize of the press fit is sufficiently large and the inner ring is of a given hardness in comparison to the shaft 3, the axial displacing motion indicated by the arrow "A" in FIG. 2, during the seating of the ring on the peripheral surface of the shaft, can result in additional effects which enhance the positional locking in the axial direction. For example, material can be scraped from the bearing seating surface of shaft 3 by the sharp edges 6a of groove 6 and collect in the groove 6 to a point where the enlarged annular ring area 10 produces the form locking connection and acquires additional reinforcement. Moreover the scraping process also produces a weldment of the shaft 3 to the inner ring as indicated in FIG. 2 in the region marked "XXXX".

What is claimed is:

1. Means for securing a hardened roller bearing ring member having a precisely machined smooth peripheral surface by means of a press fit on the softer bearing seating surface of a machine member which is a precisely machined smooth surface in a predetermined axial position, both members made of relatively hard metals and comprising means defining at least one peripheral groove (6, 7; 8, 9), which has a sharp-edged transition to the surface of the bearing ring member (2, 4) in the peripheral surface of the rolling bearing ring (2, 4) confronting the seating surface of the machine member whereby upon relative axial displacement of the ring and machine part, material flows from the seating surface into said groove under contact pressure producing a weldment adjacent said groove as a locking rib and a firm locking connection between the members.

* * * * *